United States Patent
Jin et al.

(10) Patent No.: US 12,438,199 B2
(45) Date of Patent: *Oct. 7, 2025

(54) POSITIVE ELECTRODE PLATE AND ELECTROCHEMICAL DEVICE

(71) Applicant: CONTEMPORARY AMPEREX TECHNOLOGY (HONG KONG) LIMITED, Hong Kong (CN)

(72) Inventors: Haizu Jin, Ningde (CN); Xiaowen Zhang, Ningde (CN); Zhenhua Li, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 376 days.

This patent is subject to a terminal disclaimer.

(21) Appl. No.: 17/056,479

(22) PCT Filed: Nov. 15, 2019

(86) PCT No.: PCT/CN2019/118827
§ 371 (c)(1),
(2) Date: Nov. 18, 2020

(87) PCT Pub. No.: WO2020/098788
PCT Pub. Date: May 22, 2020

(65) Prior Publication Data
US 2021/0367280 A1    Nov. 25, 2021

(30) Foreign Application Priority Data

Nov. 16, 2018   (CN) .......................... 201811371592.2

(51) Int. Cl.
*H01M 10/42* (2006.01)
*H01G 11/28* (2013.01)
(Continued)

(52) U.S. Cl.
CPC ........ *H01M 10/4235* (2013.01); *H01G 11/28* (2013.01); *H01M 4/625* (2013.01);
(Continued)

(58) Field of Classification Search
CPC ....... H01M 10/4235; H01M 2004/028; H01M 4/667; H01M 2200/106; H01M 4/622;
(Continued)

(56) References Cited

U.S. PATENT DOCUMENTS 6,103,425 A    8/2000  Harada et al.
6,451,484 B1   9/2002  Han et al.
(Continued)

FOREIGN PATENT DOCUMENTS

CN    101471435 A    7/2009
CN    101752549 A    6/2010
(Continued)

OTHER PUBLICATIONS

The First Examination Report for Europe Application No. 19884952.3, dated Feb. 2, 2022, 5 pages.
(Continued)

*Primary Examiner* — Imran Akram
(74) *Attorney, Agent, or Firm* — East IP P.C.

(57) ABSTRACT

The present application relates to a positive electrode plate and an electrochemical device. The positive electrode plate comprises a current collector, a positive active material layer and a safety coating disposed between the current collector and the positive active material layer, the safety coating comprising a polymer matrix, a conductive material and an inorganic filler, wherein the polymer matrix is fluorinated polyolefin and/or chlorinated polyolefin and the weight ratio of the polymer matrix to the conductive material is 2 or more. The positive electrode plate may improve the safety performance during nail penetration of the electrochemical
(Continued)

device such as a capacitor, a primary battery or a secondary battery.

20 Claims, 4 Drawing Sheets

(51) Int. Cl.
  *H01M 4/02* (2006.01)
  *H01M 4/62* (2006.01)
  *H01M 4/66* (2006.01)
  *H01M 10/0525* (2010.01)

(52) U.S. Cl.
  CPC .......... *H01M 4/667* (2013.01); *H01M 4/668* (2013.01); *H01M 10/0525* (2013.01); *H01M 2004/028* (2013.01); *H01M 2200/106* (2013.01); *H01M 2220/20* (2013.01)

(58) Field of Classification Search
  CPC .......... H01M 2004/021; H01M 4/366; H01M 4/625; H01M 4/623; H01M 4/624
  See application file for complete search history.

(56) References Cited

U.S. PATENT DOCUMENTS

| | | | |
|---|---|---|---|
| 6,544,688 | B1 | 4/2003 | Cheng |
| 9,627,722 | B1* | 4/2017 | Fan ................. C09D 179/08 |
| 2005/0022966 | A1 | 2/2005 | Takahashi |
| 2005/0244711 | A1 | 11/2005 | Fukui et al. |
| 2006/0008658 | A1 | 1/2006 | Fukatani et al. |
| 2009/0305111 | A1* | 12/2009 | Arai ................. H01M 8/0221 429/514 |
| 2010/0068623 | A1 | 3/2010 | Braun et al. |
| 2011/0168550 | A1* | 7/2011 | Wang ................. H01M 4/131 204/290.01 |
| 2012/0156563 | A1* | 6/2012 | Kobayashi ............ H01M 4/139 428/533 |
| 2012/0183436 | A1 | 7/2012 | Hosoe et al. |
| 2012/0183794 | A1 | 7/2012 | Guo et al. |
| 2013/0089781 | A1* | 4/2013 | Miyazaki ............... H01G 11/28 429/211 |
| 2014/0162140 | A1 | 6/2014 | Hoshiba et al. |
| 2014/0272583 | A1 | 9/2014 | Hellring et al. |
| 2014/0306263 | A1 | 10/2014 | Garbar et al. |
| 2015/0125757 | A1* | 5/2015 | Kato ................. H01M 4/668 427/58 |
| 2016/0049690 | A1 | 2/2016 | Basak et al. |
| 2016/0079582 | A1* | 3/2016 | Takeuchi ............ H01M 50/426 429/144 |
| 2016/0233667 | A1 | 8/2016 | Chen et al. |
| 2017/0092943 | A1* | 3/2017 | Li ................. H01M 10/0525 |
| 2017/0125774 | A1 | 5/2017 | Choi et al. |
| 2017/0226365 | A1* | 8/2017 | Kobayashi ........... C09D 129/04 |
| 2017/0309970 | A1* | 10/2017 | Kim ................. H01M 4/62 |
| 2017/0331146 | A1* | 11/2017 | Haba ................. H01M 4/663 |
| 2018/0151884 | A1 | 5/2018 | Yushin et al. |
| 2018/0205075 | A1* | 7/2018 | Wakizaka ............ H01M 4/133 |
| 2018/0241085 | A1 | 8/2018 | Hasegawa |
| 2018/0366704 | A1 | 12/2018 | Menig et al. |
| 2019/0140280 | A1 | 5/2019 | Zhang et al. |

FOREIGN PATENT DOCUMENTS

| | | |
|---|---|---|
| CN | 102171861 A | 8/2011 |
| CN | 102176360 A | 9/2011 |
| CN | 102208624 A | 10/2011 |
| CN | 102575322 A | 7/2012 |
| CN | 102648546 A | 8/2012 |
| CN | 102683739 A | 9/2012 |
| CN | 102881861 A | 1/2013 |
| CN | 102959768 A | 3/2013 |
| CN | 103904294 A | 7/2014 |
| CN | 104409681 A | 3/2015 |
| CN | 104823313 A | 8/2015 |
| CN | 105470523 A | 4/2016 |
| CN | 105594019 A | 5/2016 |
| CN | 105703010 A | 6/2016 |
| CN | 106450327 A | 2/2017 |
| CN | 106486639 A | 3/2017 |
| CN | 106558676 A | 4/2017 |
| CN | 106898730 A | 6/2017 |
| CN | 107004516 A | 8/2017 |
| CN | 107004858 A | 8/2017 |
| CN | 107437622 A | 12/2017 |
| CN | 107565137 A | 1/2018 |
| CN | 108281610 A | 7/2018 |
| CN | 108511761 A | 9/2018 |
| CN | 109585780 A | 4/2019 |
| CN | 109755462 A | 5/2019 |
| CN | 109755463 A | 5/2019 |
| CN | 109755468 A | 5/2019 |
| CN | 109755670 A | 5/2019 |
| CN | 111200114 A | 5/2020 |
| EP | 3147971 A1 | 3/2017 |
| EP | 3483900 A1 | 5/2019 |
| EP | 3483954 A1 | 5/2019 |
| EP | 3654419 A1 | 5/2020 |
| EP | 3654426 A1 | 5/2020 |
| EP | 3694027 A1 | 8/2020 |
| JP | 09231985 A | 9/1997 |
| JP | 2010238588 A | 10/2010 |
| JP | 2018-116810 A | 7/2018 |
| KR | 20180065167 A | 6/2018 |

OTHER PUBLICATIONS

The Third Office Action for China Application No. 201811371592.2, dated Feb. 25, 2021, 5 pages.
The Rejection Decision for China Application No. 201811371592.2, dated Apr. 28, 2021, 5 pages.
European Search Report for PCT/CN2019/118827 dated Jun. 21, 2021.
The second Office Action for Chinese Application No. 201811371592.2 dated Dec. 15, 2020.
PCT International Search Report and Written Opinion for PCT/CN2019/118827, dated Feb. 12, 2020, 12 pages.
The first Office Action for Chinese Application No. 201811371592.2, dated Sep. 10, 2020, 13 pages.
PCT International Search Report for PCT/CN2019/117852, dated Feb. 12, 2020, 12 pages.
The First Office Action and search report dated Sep. 15, 2020 for Chinese Application No. 201811367038.7, 16 pages.
The second Office Action and search report dated Dec. 9, 2020 for Chinese Application No. 201811367038.7, 8 pages.
International Search Report for PCT/CN2019/118844; dated Feb. 6, 2020; 11 pages.
The First Office Action and search report dated Sep. 1, 2020 for Chinese Application No. 201811365369.7, 10 pages.
Xia Lan et al.:"A positive-temperature-coefficient electrode with thermal protection mechanism for rechargeable lithium batteries" Chinese Science Bulletin, vol. 57, No. 31, Apr. 12, 2012, 5 pages.
Jiangong Chen:"Study on the PTC safe electrode of lithium-ion batteries" China Master's Theses Full-text Database, Engineering Science and Technology II, 2014, No. 6, Jun. 15, 2014, 65 pages.
The Extended European search report dated Dec. 18, 2019 for European Application No. 19179896.6, 7 pages.
The International search report for PCT Application No. PCT/CN2019/118667, dated Feb. 1, 2020, 18 pages.
The First Office Action for Chinese Application No. 201811372156.7, dated Sep. 1, 2020, 17 pages.
The extended European search report for EP Application No. 19885692.4, dated Jun. 21, 2021, 86 pages.
The extended European search report for EP Application No. 19885874.8, dated Jun. 8, 2021, 9 pages.
The First Office Action for U.S. Appl. No. 17/057,968, dated Aug. 25, 2023, 27 pages.

(56) References Cited

OTHER PUBLICATIONS

The First Office Action after 1st RCE for U.S. Appl. No. 17/057,968, dated Jun. 4, 2024, 14 pages.
The First Office Action for U.S. Appl. No. 18/118,753, dated Dec. 21, 2023, 19 pages.
The First Office Action for U.S. Appl. No. 16/426,871, dated May 13, 2021, 13 pages.
The First Office Action for U.S. Appl. No. 16/971,813, dated Jul. 27, 2022, 26 pages.
The Final Office Action for U.S. Appl. No. 16/971,813, dated Oct. 17, 2022, 13 pages.
The Final Office Action for U.S. Appl. No. 16/426,871, dated Sep. 2, 2021, 16 pages.
The Final Rejection after 1st RCE for U.S. Appl. No. 17/057,968, dated Nov. 29, 2024, 16 pages.
The Final Rejection after 1st RCE for U.S. Appl. No. 18/118,753, dated Jan. 23, 2025, 12 pages.
The 2nd-Final Office Action after 1st-RCE for U.S. Appl. No. 18/118,753, dated Jun. 13, 2025, 14 pages.
The 2nd-Office Action after 1st-RCE for U.S. Appl. No. 18/118,753, dated Mar. 28, 2025, 22 pages.

\* cited by examiner

POSITIVE ELECTRODE PLATE AND ELECTROCHEMICAL DEVICE

CROSS-REFERENCE TO RELATED APPLICATION

This application is a National Stage of International Application No. PCT/CN2019/118827, filed on Nov. 15, 2019, which claims priority to Chinese Patent Application No. 201811371592.2 filed on Nov. 16, 2018, both of which are hereby incorporated by reference in their entireties.

TECHNICAL FIELD

The present application relates to the field of electrochemical technology, and more particularly, to a positive electrode plate and an electrochemical device containing the positive electrode plate.

BACKGROUND

Lithium-ion batteries are widely used in electric vehicles and consumer electronics because of their advantages such as high energy density, high output power, long cycle life and small environmental pollution. However, lithium-ion batteries are prone to fire and explosion when subjected to abnormal conditions such as crushing, bumping or puncture, causing serious harm. Therefore, the safety problem of lithium-ion batteries greatly limits the application and popularity of lithium-ion batteries.

A large number of experimental results show that internal short circuit of lithium-ion battery is the basic cause of the battery's safety hazard. In order to avoid the internal short-circuit of the battery, researchers have tried to improve the battery in many ways, including the use of PTC materials to improve the safety performance of lithium-ion battery. A PTC (Positive Temperature Coefficient) material is a positive temperature coefficient heat sensitive material, which has the characteristic that its resistivity increases with increasing temperature. When the temperature exceeds a certain temperature, its resistivity increases rapidly stepwise.

In the study of utilizing the characteristics of PTC materials to improve the safety performance of lithium ion battery, some studies involve addition of PTC materials to the electrode active material layer of the battery. When the temperature of the battery rises, the resistance of the PTC material increases, thereby causing the resistance of the entire electrode active material layer to become large, and even making the conductive path of the entire electrode active material layer destroyed. Thus the security effect is achieved by causing power interruption and preventing the electrochemical reaction from proceeding. However, with this modification, the PTC material added in the electrode active material layer adversely affects the electrochemical performance of the battery.

Still other studies have provided a separate layer of PTC material (safety coating) between the current collector and the electrode active material layer of the battery. When the temperature of the battery rises, the resistance of the PTC material layer increases, so that the electric resistance between the current collector and the electrode active material layer is increased or even power supply is interrupted, thereby achieving the security effect of preventing the electrochemical reaction from proceeding. However, with this modification, when an active material slurry is coated on the surface of the PTC material layer, the solvent (such as NMP) in the slurry would dissolve the PTC material of the PTC layer and thus the dissolved PTC material enters the upper active material layer, which not only destroys the PCT effect of the PTC layer but also deteriorates its electrical performance. In addition, in the compacting step of the plate fabrication process, the PTC material layer is easily squeezed to the edge and thus the electrode active material layer would be in direct contact with the current collector, so that the PTC material layer cannot improve the safety performance. In addition, it is required to greatly improve the performance of the PTC material layer, such as the response speed, the effect of blocking current.

In view of this, it is indeed necessary to provide an electrode plate and a battery having improved safety performance and battery performance such as cycle performance, which are capable of solving the above problems.

SUMMARY

An object of the present application is to provide an electrode plate and an electrochemical device with improved safety and electrical performance.

A further object of the present application is to provide an electrode plate and an electrochemical device with good safety performance, improved electrical performance, easy processing and the like, especially with improved safety performance during nail penetration.

The present application provides a positive electrode plate including a current collector, a positive active material layer and a safety coating disposed between the current collector and the positive active material layer, characterized in that the safety coating includes a polymer matrix, a conductive material and an inorganic filler, and the polymer matrix is fluorinated polyolefin and/or chlorinated polyolefin, and a weight ratio of the polymer matrix and the conductive material is 2 or more.

The present application also provides an electrochemical device including the positive electrode plate of the present application, wherein the electrochemical device is preferably a capacitor, a primary battery or a secondary battery.

DESCRIPTION OF THE DRAWINGS

The positive electrode plate, the electrochemical device and the beneficial effects of the present application will be described in detail below with reference to the accompanying drawings and specific embodiments.

Figure 1:
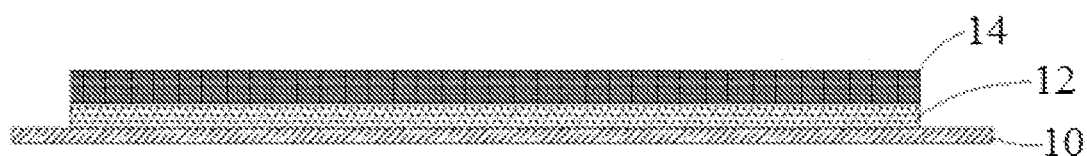
FIG. 1 is a schematic structural view of a positive electrode plate according to an embodiment of the present application, in which 10—a current collector; 14—a positive active material layer; 12—a safety coating (i.e., PTC safety coating).

In the drawings, the reference numerals are defined as follows:
1—battery pack;
  2—upper cabinet body;
  3—lower cabinet body;
  4—battery module;
    5—battery;
      51—case;
      52—electrode assembly;
      53—top cover assembly.

DETAILED DESCRIPTION

The present application discloses a positive electrode plate comprising a current collector, a positive active material layer and a safety coating disposed between the current collector and the positive active material layer, characterized in that the safety coating comprises a polymer matrix, a conductive material and an inorganic filler, and the polymer matrix is fluorinated polyolefin and/or chlorinated polyolefin, and a weight ratio of the polymer matrix and the conductive material is 2 or more.

FIG. 1 is a schematic structural view of a positive electrode plate according to some embodiments of the present application, in which 10—a current collector; 14—a positive active material layer; 12—a safety coating (i.e., PTC safety coating).

It would be easy to understand that although the PTC safety coating 12 and the positive active material layer 14 are provided only on one side of the positive current collector 10 as shown in FIG. 1, in other embodiments, the PTC safety coating 12 and the positive active material layer 14 may be provided on both sides of the positive current collector 10.

In order to overcome defects of traditional PTC safety coatings, the present application proposes a number of technical improvements, and adopts a variety of technical means to work together to improve performance and stability of PTC safety coatings.

First, it was discovered by the inventors that stability and performance of the safety coatings can be improved by selecting a polymer matrix material in the safety coatings.

In a conventional coating having PTC effect for use in batteries, fluorinated polyolefin or chlorinated polyolefin (such as PVDF) is used as a binder. When used as a binder, the amount of PVDF is much less than the amount of the matrix material. For example, PVDF binder in a conventional PTC coating is typically present in an amount of less than 15% or 10%, or even less, relative to the total weight of the coating. Some publications such as CN105594019A, CN106558676A also mention that PVDF itself may be used as a PTC matrix material, but most of them are purely speculative and have not actually verified the effects achieved by using PVDF as a PTC matrix material. Meanwhile, some other publications such as paragraph [0071] in CN104823313A explicitly recite that PVDF is not suitable for use as a PTC matrix material.

However, the inventors have found that fluorinated polyolefin and/or chlorinated polyolefin can function as a polymer matrix material for a PTC thermistor layer. Based on to the total weight of safety coating, the weight percentage of the fluorinated polyolefin and/or chlorinated polyolefin as the polymer matrix material is usually 35 wt % to 75 wt %, which is much higher than that of fluorinated polyolefin or chlorinated polyolefin such as PVDF usually used as a binder in the prior PTC thermistor layer.

In the present application, the fluorinated polyolefin and/or chlorinated polyolefin material actually functions both as a PTC matrix and as a binder, which avoids the influence on the adhesion of the coating, the response speed, and the response temperature of the PTC effect due to the difference between the binder and the PTC matrix material.

Secondly, the safety coating composed of fluorinated polyolefin and/or chlorinated polyolefin and a conductive material can function as a PTC thermistor layer and its operating temperature range is suitably from 80° C. to 160° C. Thus the high temperature safety performance of the battery may be improved well.

Furthermore, fluorinated polyolefin and/or chlorinated polyolefin as the polymer matrix material of the safety coating serves as both a PTC matrix and a binder, thereby facilitating the preparation of a thinner safety coating without affecting the adhesion of the safety coating.

In addition, the solvent such as NMP or the electrolyte in the positive active material layer over the safety coating may have an adverse effect such as dissolution, swelling on the polymer material of the safety coating. For the safety coating containing PVDF in a binder amount, the adhesion would be easy to be worse. In the safety coating of the present application, the above adverse effect is relatively low since the content of fluorinated polyolefin and/or chlorinated polyolefin is relative high.

In the positive electrode plate of the present application, based on to the total weight of the safety coating, the weight percentage of fluorinated polyolefin and/or chlorinated polyolefin as the polymer matrix material is usually from 35 wt % to 75 wt %. If the content is too small, the polymer matrix cannot ensure the safety coating works well in terms of its PTC effect; and if the content is too high, the content of the conductive material and the inorganic filler will be too low and thus the response speed of the safety coating will affected. The weight percentage of the fluorinated polyolefin and/or chlorinated polyolefin polymer matrix is preferably from 40 wt % to 75 wt %, more preferably from 50 wt % to 75 wt %.

In the present application, fluorinated polyolefin and/or chlorinated polyolefin as the polymer matrix of the safety coating refers to polyvinylidene fluoride (PVDF), polyvinylidene chloride (PVDC), modified PVDF, and/or modified PVDC. For example, said fluorinated polyolefin and/or chlorinated polyolefin may be selected from PVDF, carboxylic acid modified PVDF, acrylic acid modified PVDF, PVDF copolymers, PVDC, carboxylic acid modified PVDC, acrylic acid modified PVDC, PVDC copolymers or any mixture thereof.

Secondly, it was discovered by the inventors that addition of an inorganic filler to the safety coating of positive electrode plate can stabilize the safety coating.

It has been found that in the case that the safety coating does not contain an inorganic filler, the solvent such as NMP in the positive active material layer or the electrolyte over the safety coating may adversely dissolve and swell the polymer material in the safety coating, thereby damaging the safety coating and affecting its PTC effect. After adding an inorganic filler to the safety coating, the inorganic filler functions as a barrier, thereby advantageously eliminating the above-mentioned adverse effects such as dissolution and swelling, and thus advantageously stabilizing the safety coating. In addition, it has also been found that the addition of the inorganic filler is also advantageous for ensuring that the safety coating is not easily deformed during compaction of the electrode plate. Therefore, the addition of the inorganic filler can well ensure that the safety coating is stably disposed between the metal current collector and the positive active material layer and that the metal current collector is prevented from directly contacting the positive active material layer, thereby improving safety performance of the battery.

The inventors have also unexpectedly discovered that inorganic fillers can also improve the performance such as the response speed of the safety coating. The safety coating works as below. At normal temperature, the safety coating relies on a good conductive network formed between the conductive materials to conduct electron conduction. When the temperature rises, the volume of the polymer matrix materials begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero. However, usually the conductive network is partially recovered, when the inside of the safety coating reaches a dynamic balance. Therefore, after reaching a certain temperature for example, the operating temperature, the resistance of the safety coating is not as large as expected, and still there is very small current flowing through. The inventors have found that after the inorganic filler is added and the volume of the polymer matrix materials expands, the inorganic filler and the expanded polymer matrix material can function to block the conductive network. Therefore, after the addition of the inorganic filler, the safety coating can better produce PTC effect in the operating temperature range. That is to say, the increasing speed of resistance is faster and the PTC response speed is faster at a high temperature. Thus, the safety performance of battery can be improved better.

The inorganic filler is present in a weight percentage of 10 wt % to 60 wt % based on the total weight of the safety coating. If the content of the inorganic filler is too small, it will not be enough to stabilize the safety coating; if the content is too large, it will affect the PTC performance of the safety coating. The weight percentage of the inorganic filler is preferably from 15 wt % to 45 wt %.

The inorganic filler is selected from at least one of metal oxides, non-metal oxides, metal carbides, non-metal carbides, and inorganic salts, all optionally modified with at least one of a conductive carbon coating, a conductive metal coating or a conductive polymer coating.

For example, the inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium manganese oxide, lithium nickel oxide, lithium nickel manganese oxide, lithium nickel manganese cobalt oxide, lithium nickel manganese aluminium oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, and lithium titanate, all optionally modified with at least one of a conductive carbon coating, a conductive metal coating or a conductive polymer coating.

Especially, the inventors have found that it is particularly advantageous when a positive electrochemically active material optionally modified with a conductive carbon coating, a conductive metal coating or a conductive polymer coating is used as an inorganic filler in the case that the safety coating is used for a positive electrode plate. In such a case, in addition to above mentioned functions as stabilizing the safety coating (hindering organic solvent from dissolving or swelling the polymer material of the binding layer and ensuring that the binding layer is not easily deformed) and as improving the performance such as the response speed of the safety coating, the inorganic filler may further play the following two roles:

(1) To improve the overcharge performance of the battery. In the PTC safety coating system composed of a fluorinated polyolefin and/or chlorinated polyolefin polymer matrix and a conductive material, since the electrochemically active material has the characteristics of lithium ion intercalation and de-intercalation, the electrochemically active material can be used as "active sites" in the conductive network at the normal operating temperature of the battery and thus the number of "active sites" in the safety coating is increased. In the process of overcharging, the electrochemically active material will delithiate, the de-lithiating process has become more and more difficult, and the impedance is increasing. Therefore, when the current passes, the heat-generating power increases, and the temperature of the primer layer increases faster, so the PTC effect responds faster, which in turn can generate PTC effects before the overcharge safety problem of battery occurs. Thus the battery overcharge safety performance may be improved.

(2) To contribute to charge and discharge capacity. Since the electrochemically active material can contribute to a certain charge and discharge capacity at the normal operating temperature of the battery, the effect of the safety coating on the electrochemical performance such as capacity of the battery at the normal operating temperature can be dropped to the lowest.

Therefore, for the positive electrode plate, it is the most preferred to use a positive electrochemically active material optionally modified with a conductive carbon coating, a conductive metal coating or a conductive polymer coating as the inorganic filler of the safety coating. The positive electrochemically active material is preferably selected from at least one of lithium cobalt oxide, lithium nickel manganese cobalt oxide, lithium nickel manganese aluminium oxide, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, and lithium titanate, all optionally modified with at least one of a conductive carbon coating, a conductive metal coating, and a conductive polymer coating. Especially, the positive electrochemically active material is at least one of the above electrochemically active materials modified with a conductive carbon coating, such as conductive carbon coating modified lithium cobalt oxide, conductive carbon coating modified lithium nickel manganese cobalt oxide, conductive carbon coating modified lithium nickel manganese aluminium oxide, conductive carbon coating modified lithium iron phosphate, conductive carbon coating modified lithium vanadium phosphate, conductive carbon coating modified lithium cobalt phosphate, conductive carbon coating modified lithium manganese phosphate, conductive carbon coating modified lithium manganese iron phosphate, conductive carbon coating modified lithium iron silicate, conductive carbon coating modified lithium vanadium silicate, conductive carbon coating modified lithium cobalt silicate, conductive carbon coating modified lithium manganese silicate, conductive carbon coating modified spinel lithium manganese oxide, conductive carbon coating modified spinel lithium nickel manganese oxide, conductive carbon coating modified lithium titanate. These electrochemically active materials and conductive carbon coating modified electrochemically active materials are commonly used materials in the manufacture of lithium batteries, most of which are commercially available. The type of conductive carbon may be graphite, graphene, conductive carbon black, carbon nanotubes or the like. Further, the conductivity of the inorganic filler can be adjusted by adjusting the content of the conductive carbon coating.

When the particle size of the inorganic filler is too small, it will have increased specific surface area and thus side reaction will increase; when the particle size of the inorganic filler is too large, the application thickness of the safety coating is too large and the coating is not easy to be even. Preferably, the average particle size D of the positive active material in the safety coating satisfies the relationship of 100 nm≤D≤10 μm, more preferably 1 μm≤D≤6 μm. When the particle size of the inorganic filler is in the above ranges, it may also improve the effect of blocking the conductive network at high temperature, thereby improving the response speed of the safety coating. Further preferably, the positive active material in the safety coating has a specific surface area (BET) of not more than 500 $m^2/g$. When the specific surface area of the inorganic filler increases, side reaction will increase and thus the battery performance will be affected. Moreover, in the case that the specific surface area of the inorganic filler is too large, a higher proportion of binder will be required to be consumed, which will cause the binding force among the safety coating, the current collector and the positive active material layer to be reduced and the growth rate of the internal resistance to be high. When the specific surface area (BET) of the inorganic filler is not more than 500 $m^2/g$, a better overall effect can be provided.

Thirdly, it was discovered by the inventors that the amount ratio of conductive material and polymer matrix also has a large effect on the performance of safety coating.

In addition to the polymer matrix and the inorganic filler, the safety coating provided between the current collector and the positive active material layer also comprises a conductive material.

In the present application, the safety coating works as below. At a normal temperature, the safety coating relies on a good conductive network formed between the conductive materials to conduct electron conduction. When the temperature rises, the volume of the polymer matrix material begins to expand, the spacing between the particles of the conductive materials increases, and thus the conductive network is partially blocked, so that the resistance of the safety coating increases gradually. When a certain temperature for example an operating temperature is reached, the conductive network is almost completely blocked, and the current approaches zero, thereby protecting the electrochemical device with the safety coating. Therefore, the amount ratio of the conductive material and the polymer matrix material is important for the PTC layer to function properly. In the present application, based on the total weight of the safety coating, the conductive material has a weight percentage of 5 wt % to 25 wt %, preferably of 5 wt % to 20 wt %.

It was found that in the safety coating, the PCT effect would be better when the weight ratio of the polymer matrix material to the conductive material is 2 or more. Moreover with the above ratio, the safety performance during nail penetration can be further improved. If the weight ratio of the polymer matrix material to the conductive material is less than 2, the content of the conductive material is relatively high, and the conductive network may not be sufficiently broken at elevated temperature, thereby affecting the PTC effect.

If the weight ratio of the polymer matrix material to the conductive material is too high, the content of the conductive material is relatively low, which causes a large increase in the DCR (DC internal resistance) of the battery at normal operation.

Preferably, the weight ratio of the polymer matrix to the conductive material is 8 or less. In an embodiment of the present application, the weight ratio of the polymer matrix to the conductive material is 3 or more and 8 or less.

The conductive material may be selected from at least one of a conductive carbon-based material, a conductive metal material, and a conductive polymer material. As an example, the conductive carbon-based material may be selected from at least one of conductive carbon black, acetylene black, graphite, graphene, carbon nanotubes, carbon nanofibers; the conductive metal material may be selected from at least one of Al powder, Ni powder, and gold powder; and the conductive polymer material may be selected from at least one of conductive polythiophene, conductive polypyrrole, and conductive polyaniline. The conductive materials may be used alone or in combination of two or more.

Conductive materials are typically used in the form of powders or granules. The particle size may be 5 nm to 500 nm, for example, 10 nm to 300 nm, 15 nm to 200 nm, 15 nm to 100 nm, 20 nm to 400 nm, 20 nm to 150 nm, or the like, depending on the specific application environment.

Therefore, performance and stability of the safety coatings may be greatly improved by selecting fluorinated polyolefin and/or chlorinated polyolefin as the matrix material for the PTC safety coating, adding an inorganic filler especially a positive active material to the safety coating, and controlling the amount ratio of the matrix material and the conductive material.

In addition, it was found that performance of the safety coatings can be further improved through optimization.

As a further improvement of another aspect of the present application, the polymer matrix in the safety coating of the positive electrode plate is preferably subjected to crosslinking treatment. That is to say, it is fluorinated polyolefin and/or chlorinated polyolefin having a crosslinked structure.

The crosslinking treatment may be more advantageous for hindering the adverse effects of a solvent such as NMP in the positive active material layer or an electrolyte on the polymer material in the safety coating, such as dissolving or swelling, and for preventing the positive active material layer from cracking due to uneven stress.

In addition, the polymer matrix which is not subjected to crosslinking treatment has a large swelling in the electrolyte, so causes a large DCR growth of battery, which is disadvantageous to improvement of the dynamic performance of battery. After being subjected to crosslinking treatment, the polymer matrix has an effectively suppressed swelling ratio, so that the DCR growth due to introduction of the safety coating can be remarkably reduced.

The procedure of the crosslinking treatment is known in the art. For example, for fluorinated polyolefin and/or chlorinated polyolefin polymer matrix, the crosslinking treatment can be achieved by introducing an activator and a crosslinking agent. The function of the activator is to remove HF or HCl from fluorinated polyolefin and/or chlorinated polyolefin to form a C=C double bond; and the crosslinking agent acts to crosslink the C=C double bond. As an activator, a strong base-weak acid salt such as sodium silicate or potassium silicate can be used. The weight ratio of the activator to the polymer matrix is usually from 0.5% to 5%. The crosslinking agent may be selected from at least one of polyisocyanates (JQ-1, JQ-1E, JQ-2E, JQ-3E, JQ-4, JQ-5, JQ-6, PAPI, emulsifiable MDI, tetraisocyanate), polyamines (propylenediamine, MOCA), polyols (polyethylene glycol, polypropylene glycol, trimethylolpropane), glycidyl ethers (polypropylene glycol glycidyl ether), inorganic substances (zinc oxide, aluminum chloride, aluminum sulfate, sulfur, boric acid, borax, chromium nitrate), glyoxal, aziridine, ethylenically unsaturated compounds (styrene, α-methylstyrene, acrylonitrile, acrylic acid, methacrylic acid, acrylates (1,4-butylene glycol diacrylate, ethylene glycol dimethacrylate, triallyl cyanurate (TAC), butyl acrylate, 2-hydroxyethyl acrylate (HEA), hydroxypropyl acrylate 2-hydroxyethyl methacrylate (HEMA), 2-hydroxypropyl methacrylate (HPMA), methyl methacrylate (MMA))), organosilicons (ethylorthosilicate, methyl orthosilicate, trimethoxysilane), benzenesulfonic acids (p-toluenesulfonic acid, p-toluenesulfonyl chloride), organic peroxides (dicumyl peroxide, bis(2,4-dichlorobenzoyl) peroxide), and metal organic compounds (aluminum isopropoxide, zinc acetate, titanium acetylacetonate).

The weight ratio of the crosslinking agent to the polymer matrix is from 0.01% to 5%. If the content of crosslinking agent is too small, the crosslinking degree of the polymer matrix is relatively low, which cannot eliminate cracking completely. If the content of crosslinking agent is too high, it is easy to cause gel during stirring. The activator and the crosslinking agent may be added after the stirring step of the slurry for preparing the safety coating is completed. After carrying out the crosslinking reaction, the mixture is uniformly stirred and then coated to prepare a safety coating.

In addition to the polymer matrix, the conductive material, and the inorganic filler, the safety coating may also contain other materials or components, such as other binders that promote adhesion between the coating and the substrate for the metal current collector. Those skilled in the art can select other auxiliaries according to actual needs. For example, in some other embodiments of the present application, the safety coating may also comprise other binders. In still other embodiments of the present application, the safety coating may further include other polymer matrix other than the above mentioned polymer matrix. In this case, "the weight ratio of the polymer matrix to the conductive material" means the weight ratio of the fluorinated polyolefin and/or the chlorinated polyolefin polymer matrix to the conductive material. Since fluorinated polyolefin and/or chlorinated polyolefin polymer matrix material itself has a good adhesion, in order to simplify the process and to save the cost, in a preferred embodiment of the present application in which fluorinated polyolefin and/or chlorinated polyolefin is used as a polymer matrix material, the safety coating layer is substantially free of other binders or other polymer matrices other than the matrix material in which the phrase "substantially free" means ≤3%, ≤1%, or ≤0.5%.

Moreover, in some preferred embodiments of the present application in which fluorinated polyolefin and/or chlorinated polyolefin is used as a polymer matrix, the safety coating may consist substantially of the polymer matrix, the conductive material, and the inorganic filler, which is free of a significant amount ≤3%, ≤1%, or ≤0.5%) of other components.

In the positive electrode plate of the present application, the safety coating is directly adhered to the current collector and is disposed between the current collector and the positive active material layer. The thickness H of the safety coating may be reasonably determined according to actual demand. The thickness H of the safety coating is usually not more than 40 µm, preferably not more than 25 µm, more preferably not more than 20 µm, 15 µm or 10 µm. The coating thickness of the safety coating is usually greater than or equal to 1 µm, preferably greater than or equal to 2 µm, and more preferably greater than or equal to 3 µm. If the thickness is too small, it is not enough to ensure that the safety coating improves the safety performance of the battery; if it is too large, the internal resistance of the battery will increase seriously, which will affect the electrochemical performance of the battery during normal operation. Preferably, it satisfies 1 µm≤H≤20 µm, more preferably 3 µm≤H≤10 µm.

In the present application, the safety coating and the positive active material layer are collectively referred to as a film layer. Further, the film layer and the current collector of the electrode plate has a binding force of preferably 10 N/m or more. Larger binding force can improve the safety performance of the battery during nailing penetration. For example, the binding force between the safety coating and the current collector can be increased by introducing an additional binder or by carrying out crosslinking treatment to the polymer matrix, thereby increasing the binding force between the film layer and the current collector.

In consideration of the safety performance during nail penetration, the elongation at break δ of the current collector has an important effect on the safety performance of battery. It was found that if the elongation at break of the current collector is too large, the metal burrs will be larger, which is not conducive to improving safety performance of the battery; if the elongation at break of the current collector is too small, breakage is likely to occur during processing such as plate compaction or when the battery is squeezed or collided, thereby degrading quality or safety performance of the battery. Therefore, in order to further improve safety performance, particularly safety performance during nail penetration, the elongation at break δ of the current collector should be not more than 4% and not less than 0.8%. The elongation at break of the metal current collector can be adjusted by changing purity, impurity content and additives of the metal current collector, the billet production process, the rolling speed, the heat treatment process, and the like.

For the current collector, the common materials in the art, preferably metal current collectors, such as metal flakes or metal foils of stainless steel, aluminum, copper, titanium can be used. The metal current collectors have a thickness of 4 µm~16 µm. Preferably the current collector is an aluminum-containing porous current collector for example, a porous aluminum foil. Use of the porous aluminum foil can reduce the probability of occurrence of the metal burrs and further reduce the probability of occurrence of a severe aluminothermic reaction in an abnormal situation such as nailing. Therefore, safety performance of the battery may be further improved. In addition, use of porous aluminum foil can also improve infiltration of the electrolyte to the electrode plate, and thereby improve the dynamic performance of the lithium ion battery. The safety coating can cover the surface of the porous aluminum foil to prevent leakage of the upper active material layer during the coating process.

The positive active material layer used in the present application may be selected from various positive active material layers suitable for a lithium ion battery in the art, and the components and preparation thereof are well known in the art. The positive active material layer contains a positive active material, and various positive electrode active materials for preparing a lithium ion secondary battery positive electrode known to those skilled in the art may be used. For example, the positive electrode active material is a lithium-containing composite metal oxide, for example one or more of $LiCoO_2$, $LiNiO_2$, $LiMn_2O_4$, $LiFePO_4$, and lithium nickel cobalt manganese oxide (such as $LiNi_{0.5}Co_{0.2}Mn_{0.3}O_2$) and one or more of lithium nickel manganese oxide.

Those skilled in the art will appreciate that various definition or preferred ranges of the component selection, component content, and material physicochemical properties (such as particle size, specific surface area) in the various embodiments of the present application mentioned above can be combined arbitrarily. The combined embodiments are still within the scope of the application and are considered as part of the disclosure.

The negative electrode plate for use in conjunction with the positive electrode plate of the present application may be selected from various conventional negative electrode plates commonly used in the art, and the components and preparation thereof are well known in the art. For example, the negative electrode plate may comprises a negative electrode current collector and a negative active material layer disposed on the negative electrode current collector, and the negative active material layer may comprise a negative active material, a binder, a conductive material, and the like. The negative active material is, for example, a carbonaceous material such as graphite (artificial graphite or natural graphite), conductive carbon black, carbon fiber; a metal or a semimetal material such as Si, Sn, Ge, Bi, Sn, In, or an alloy thereof; and a lithium-containing nitride or a lithium-containing oxide, a lithium metal or a lithium aluminum alloy.

The present application also discloses an electrochemical device, comprising the positive electrode plate according to the present application. The electrochemical device may be a capacitor, a primary battery or a secondary battery, for example a lithium-ion capacitor, a lithium-ion battery or a sodium-ion battery. Except for the use of the positive electrode plate as described above, the construction and preparation methods of these electrochemical devices are known per se. Due to the use of the positive electrode plate as described above, the electrochemical device can have an improved safety for example during nail penetration and electrical performance such as cycle performance. Furthermore, the positive electrode plate according to this application can be easily processed, so that the manufacturing cost of the electrochemical device can be reduced by using the positive electrode plate according to the present application.

Figure 2:
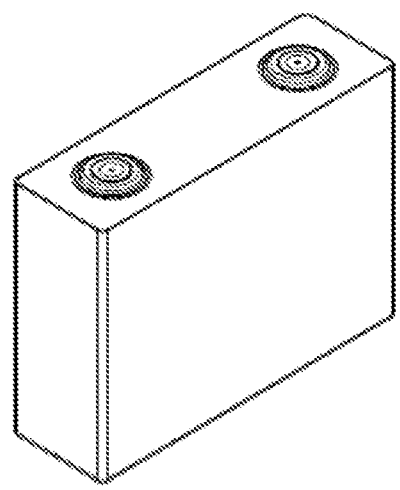
FIG. 2 is a perspective view of a lithium ion battery according to an embodiment of the present application.
Figure 3:
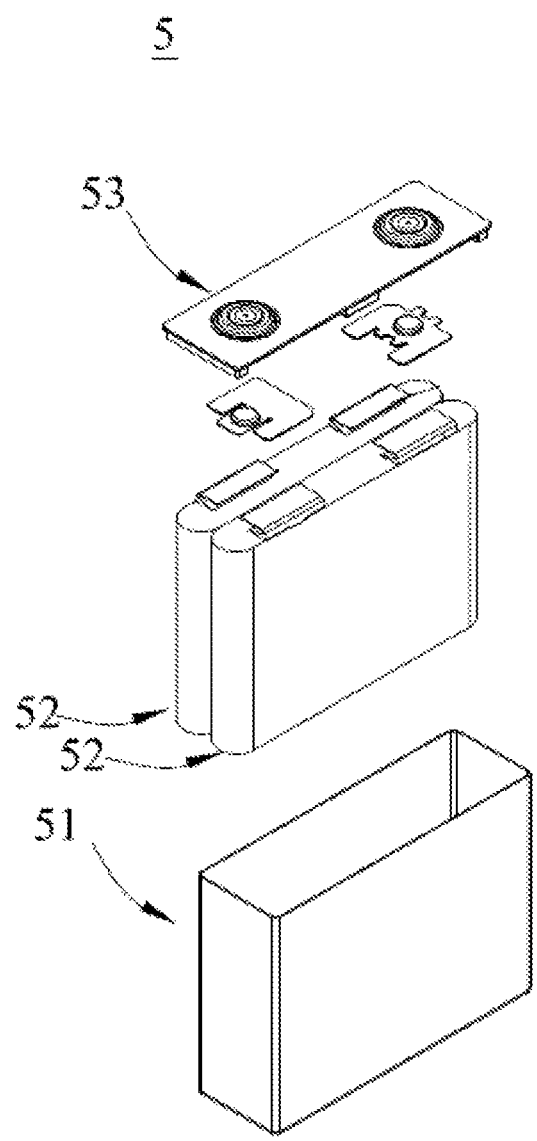
FIG. 3 is an exploded view of FIG. 2.

In a particular embodiment of the present application, the electrochemical device is a lithium ion battery. FIG. 2 is a perspective view of a lithium ion battery 5 according to an embodiment of the present application. FIG. 3 is an exploded view of FIG. 2. Referring to FIG. 2 and FIG. 3, the lithium ion battery 5 includes a case 51, an electrode assembly 52, a top cover assembly 53, and an electrolyte (not shown).

The electrode assembly 52 is packed in the case 51. The number of electrode assembly 52 is not limited and may be one or more. The electrode assembly 52 includes a positive electrode plate, a negative electrode plate, and a separator. The separator separates the positive electrode plate from the negative electrode plate. The electrolyte is injected into the case 51 and has soaked through the electrode assembly 52, the electrode assembly comprising, for example, a first electrode plate, a second electrode plate and a separator.

Please be noted that the lithium ion battery 5 shown in FIG. 2 is a can-type battery, but is not limited thereto, and the lithium ion battery 5 may be a pouch-type battery in which the case 51 is replaced by a metal plastic film and the top cover assembly 53 is removed.

Next, a battery module according to another aspect of the present application will be described.

Figure 4:
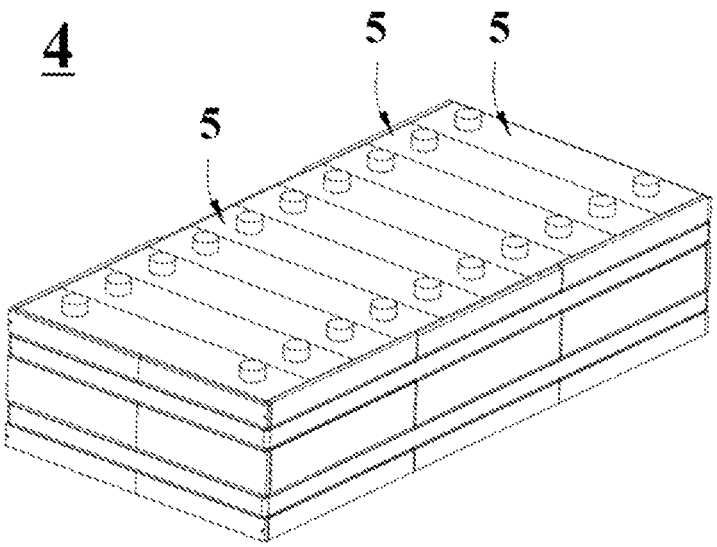
FIG. 4 is a perspective view of a battery module according to an embodiment of the present application.

FIG. 4 is a perspective view of a battery module 4 according to an embodiment of the present application.

The battery module 4 according to an embodiment of the present application comprises the lithium-ion battery 5 according to the present application.

Referring to FIG. 4, the battery module 4 includes a plurality of batteries 5. A plurality of lithium ion batteries 5 are arranged in the longitudinal direction. The battery module 4 can function as a power source or an enemy storage device. The number of lithium ion battery 5 contained the battery module 4 can be adjusted according to the application and capacity of the battery module 4.

Next, a battery pack according to a still another aspect of the present application will be described.

Figure 5:
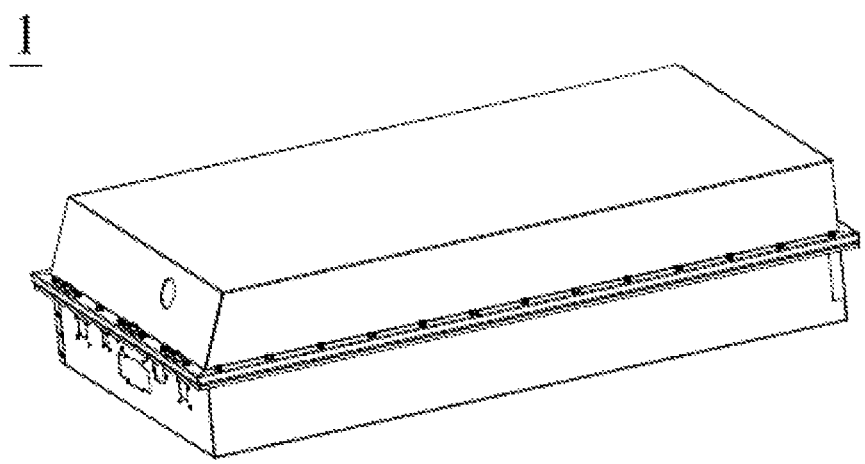
FIG. 5 is a perspective view of a battery pack according to an embodiment of the present application.
Figure 6:
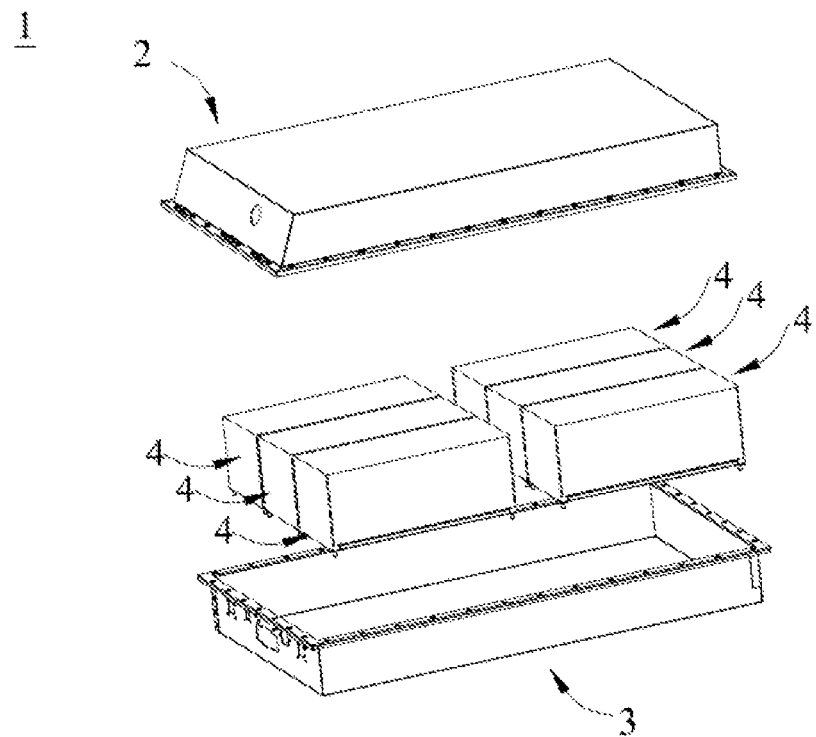
FIG. 6 is an exploded view of FIG. 5.

FIG. 5 is a perspective view of a battery pack 1 according to an embodiment of the present application. FIG. 6 is an exploded view of FIG. 5.

The battery pack 1 according to the present application comprises the battery module 4 according to an embodiment of the present application.

Specifically, referring to FIG. 5 and FIG. 6, the battery pack 1 includes an upper cabinet body 2, a lower cabinet body 3, and a battery module 4. The upper cabinet body 2 and the lower cabinet body 3 are assembled together to form a space in which the battery module 4 is packed. The battery module 4 is placed in the space formed by assembling the upper cabinet body 2 and the lower cabinet body 3 together. The output polar of the battery module 4 is passed through one or both of the upper cabinet body 2 and the lower cabinet body 3 to supply power to the outside or to be charged from the outside. The number and arrangement of the battery modules 4 contained in the battery pack 1 can be determined according to actual needs.

Next, a device according to still another aspect of the present application will be described.

Figure 7:
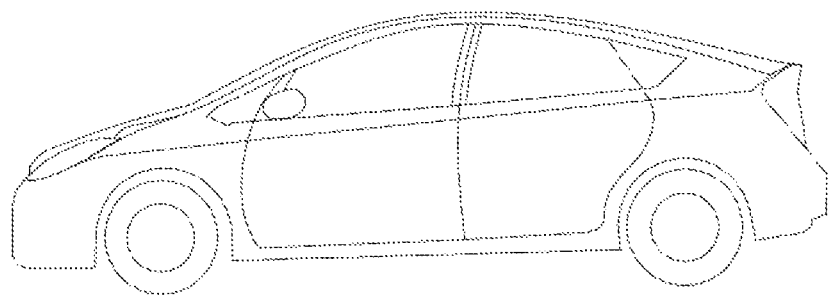
FIG. 7 is a schematic view showing a device with a lithium ion battery as a power source according to an embodiment of the present application.

FIG. 7 is a schematic view showing a device with a lithium ion battery as a power source according to an embodiment of the present application.

The device according to the present application comprises the lithium ion battery 5 according to an embodiment of the present application, and the lithium ion battery 5 can be used as a power source of the device. In FIG. 7, the device with the lithium ion battery 5 is an electric car. Apparently, without limited thereto the device with the lithium ion battery 5 may be any other electric vehicles (such as, an electric bus, an electric tram, an electric bicycle, an electric motorcycle, an electric scooter, an electric golf cart, an electric truck), electric ships, electric tools, electronic equipment and energy storage systems. The electric vehicle can be a pure electric vehicle, a hybrid electric vehicle, or a plug-in hybrid electric vehicle. Apparently, according to the actual form of use, the device according to the present application may comprises the battery module 4 as described in the present application. Apparently, the device according to the present application may also comprises the battery pack 1 as described in the present application.

Examples

In order to make the objects, the technical solutions and the beneficial technical effects of the present application more clear, the present application will be described in further detail below with reference to the embodiments.

However, it is to be understood that embodiments of the present application are only intended to be illustrative of the present application, and are not intended to limit the application, and embodiments of the present application are not limited to those embodiments given in the specification. The experimental conditions not indicated in the examples refer to conventional conditions, or the conditions recommended by the material supplier or equipment supplier.

1. Preparation Method 1.1 Preparation of Positive Electrode Plate

1) Safety Coating

Depending on whether or not the polymer matrix material in the safety coating is subjected to crosslinking treatment, the safety coating was prepared by one of the following two methods.

For the polymer matrix without cross-linking treatment:

A certain ratio of a polymer matrix material, a conductive material, and an inorganic filler were mixed with N-methyl-2-pyrrolidone (NMP) as a solvent with stirring uniformly. The resulting mixture was then coated on both sides of metal current collector, followed by drying at 85° C. to obtain a PTC layer, i.e. a safety coating.

For the polymer matrix with cross-linking treatment:

A certain ratio of a polymer matrix material, a conductive material, and an inorganic filler were mixed with N-methyl-2-pyrrolidone (NMP) as a solvent with stirring uniformly and then an activator (sodium silicate) and a crosslinking agent were added with stirring uniformly. The resulting mixture was then coated on both sides of metal current collector, followed by drying at 85° C. to obtain a safety coating.

2) Positive Active Material Layer

Then, 90 wt % of a positive active material, 5 wt % of SP, and 5 wt % of PVDF were mixed with NMP as a solvent with stirring uniformly. The resulting mixture was then coated on the safety coating of the current collector as prepared according to the above method followed by drying at 85° C. to obtain a positive active material layer.

3) Work Up

Then, the current collector with two layers of positive active material layers was cold-pressed, then trimmed, cut, and stripped, followed by drying under vacuum at 85° C. for 4 hours. After welding, the positive electrode plate meeting the requirements of the secondary battery was obtained.

The main materials used in the specific examples of safety coating were as follows:

Polymer matrix: PVDF (Manufacturer "Solvay", model 5130), PVDC;

Crosslinking agent: tetraisocyanate, polyethylene glycol, acrylonitrile;

Conductive material (conductive agent): Super-P (TIMCAL, Switzerland; abbreviated as SP);

Inorganic filler: lithium iron phosphate (abbreviated as LFP), carbon coating modified lithium iron phosphate (abbreviated as LFP/C), carbon coating modified lithium titanate (abbreviated as $Li_4Ti_5O_{12}$/C) and alumina;

Positive active material: NCM811 ($LiNi_{0.8}Co_{0.1}Mn_{0.1}O_2$).

The above materials were commonly used materials in the lithium battery industry which may be commercially available from the corresponding suppliers.

1.2 Preparation of Negative Electrode Plate

Negative electrode plate was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative electrode current collector in the form of copper foil, and dried at 85° C., then trimmed, cut, and stripped, followed by drying under vacuum at 110° C. for 4 hours. After welding, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a volume ratio of 3:5:2 to obtain a mixed solvent of EC/EMC/DEC, followed by dissolving the fully dried lithium salt $LiPF_6$ into the mixed organic solvent at a concentration of 1 mol/L to prepare an electrolyte.

1.4 Preparation of the Battery

A polypropylene film with a thickness of 12 μm was used as a separator, and the positive electrode plate, the separator and the negative electrode plate were stacked in order, so that the separator was sandwiched in between the positive electrode plate and the negative electrode plate, and then the stack was wound into a bare battery core. After vacuum baking at 75° C. for 10 h, the electrolyte (prepared as described in "Preparation of electrolyte" above) was injected therein followed by vacuum package and standing for 24 h. After that, the battery cell was charged to 4.2 V with a constant current of 0.1 C, and then was charged with a constant voltage of 4.2 V until the current dropped to 0.05 C, and then was discharged to 3.0V with a constant current of 0.1 C. Above charging and discharging processes were repeated twice. Finally, the battery cell was charged to 3.8V with a constant current of 0.1 C, thereby completing the preparation of the secondary battery.

2. Tests for Material Performance

In each of the examples and comparative examples, the physical property parameters of the materials were measured by the common method in the art, unless otherwise specified.

Some specific parameters were tested using the following methods.

2.1 Particle Size

The power sample was dispersed in a dispersing medium (distilled water), which was measured with a Malvern laser particle size analyzer MS2000 for 5 times and averaged in μm.

2.2 BET (Specific Surface Area)

The specific surface area of the powder sample of the test material was measured with a Quadrasorb SI specific surface tester for 5 times and averaged in unit of $m^2/g$.

2.3 Binding Force Between Film Layer and Current Collector

The electrode plate containing a film layer on both sides of the current collector was cut into a sample to be tested having a width of 2 cm and a length of 15 cm. One side of the sample to be tested was uniformly adhered to a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by the width of the sample i.e. 0.02 m to calculate the binding force (N/m).

2.4 Elongation at Break of Current Collector

Two samples having a length of 200 mm and a width of 15 mm were taken from the current collector. The thickness H was measured by micrometer in μm. The sample was then mounted on a tensile machine (model A17000) and stretched at 50 mm/min. Two test results were averaged. Record the initial length L0, and start the tensile machine, until the sample broke, and read the displacement L1 of the sample at break from the tensile machine. Elongation at break=(L1−L0)/L0*100%.

2.5 Thickness of Current Collector and Thickness of Coating

Thickness of the current collector was measured by a micrometer at 5 points and averaged.

Thickness of the coating: first measure the thickness of the current collector, and then measure the total thickness of the current collector with the coating. The difference between the two values was used as the thickness of the coating.

2.6 Cracking of Coating

After drying and obtaining a positive active material layer, if no cracks were observed in the 100 m² electrode plate, it was defined as no cracking; if the number of occurrences of cracks in 100 m² electrode plate was ≤3, it was defined as mild cracking; if the number of occurrences of cracks in 100 m² electrode plate was >3, it was defined as severe cracking.

3. Test for Battery Performance

The safety performance of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 min (the tip thereof had a cone angle of 45°) was used to puncture the battery plate at a speed of 25 mm/s in the direction perpendicular to the battery plate. The puncture position should be close to the geometric center of the surface to be punctured, the steel needle stayed in the battery, and then observation was made to see if the battery had an indication of burning or exploding.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach a voltage of 1.5 times the charging cut-off voltage or after charging with a constant current of 1 C for 1 hour, the charging was terminated.

3.3 Cycle Performance Test:

The test conditions for the cycle performance test were as follows: the secondary battery was subjected to a 1 C/1 C cycle test at 25° C. in which the charging and discharging voltage range was 2.8 to 4.2 V. The test was terminated when the capacity was attenuated to 80% of the first discharging specific capacity.

3.4 PTC Effect Test

The secondary battery was fully charged to the charging cut-off voltage with a current of 1 C, and then charged with a constant voltage until the current was reduced to 0.05 C. After that, the charging was terminated and the DC resistance of the battery cell was tested (discharging with a current of 4 C for 10 s). Then, the battery cell was placed at 130° C. for 1 h followed by testing the DC resistance, and calculating the DC resistance growth rate. Then, the battery cell was placed at 130° C. for 2 h followed by testing the DC resistance, and calculating the DC resistance growth rate.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. DCR=(U1−U2)/4 C.

In the present application, for convenience of comparison, the DCR of the battery core in which the polymer material only containing uncrosslinked PVDF was used as a control, and was recorded as 100%, and the DCR of the other battery cores and the ratio thereof were calculated and recorded.

4. Performance Test Results 4.1 Protection Performance (PTC Effect) of Safety Coating and Effect Thereof on Battery Performance In order to confirm the protection performance of safety coating, the corresponding safety coating, positive electrode plate, negative electrode plate and battery were prepared with the specific materials and amounts listed in Table 1-1 below according to the methods and procedures described in "1. Preparation method", and were tested according to the method specified in "3. Tests for battery performance".

In order to ensure accuracy of data, 4 samples were prepared for each battery (10 samples for the puncture test) and tested independently. The test results were finally averaged and shown in Table 1-2 and Table 1-3.

In the test, the conventional electrode plate CPlateP was prepared with the method described in "1.1 Preparation of positive electrode plate", but no safety coating was provided. That is to say, a positive active material was directly applied over the current collector. The conventional electrode plate CPlate N was prepared according to the method described in "1.2 Preparation of negative electrode plate".

TABLE 1-1

| | | | Composition of the safety coating | | | | | | |
|---|---|---|---|---|---|---|---|---|---|
| | Current collector | positive active material | polymer matrix material | wt % | conductive material | wt % | Inorganic filler material | wt % | Thickness of safety coating H (μm) |
| CPlate P | Al foil | NCM811 | / | / | / | / | / | / | / |
| Comp. Plate CP | Al foil | NCM811 | Uncrosslinked PVDF | 90 | SP | 10 | / | / | 20 |
| Plate 1 | Al foil | NCM811 | Uncrosslinked PVDC | 35 | SP | 10 | alumina | 55 | 10 |
| Plate 2 | Al foil | NCM811 | Uncrosslinked PVDF | 35 | SP | 10 | LFP | 55 | 3 |

TABLE 1-2

Performance of lithium-ion batteries

| Battery No. | Positive electrode plate | Negative electrode plate | Puncture Test |
|---|---|---|---|
| Battery 1 | CPlate P | CPlate N | 0 pass, 10 not pass |
| Battery 2 | Comp. Plate CP | CPlate N | 2 pass, 8 not pass |
| Battery 3 | Plate 1 | CPlate N | 10 pass |
| Battery 4 | Plate 2 | CPlate N | 10 pass |

TABLE 1-3

Performance of lithium-ion batteries

| Battery No. | Positive electrode plate | Negative electrode plate | Growth of DCR (130° C., 1 h) | Growth of DCR (130° C., 2 h) |
|---|---|---|---|---|
| Battery 2 | Comp. Plate CP | CPlate N | 20% | 30% |
| Battery 4 | Plate 2 | CPlate N | 1200% | 1500% |

The data in Table 1-1 and Table 1-2 indicated that the safety coating with PVDF or PVDC as a polymer matrix significantly improved the safety performance of the battery during nail penetration, especially in the case that an inorganic filler was added. The growth of DCR data in Table 1-3 indicated that the safety coating composed of PVDF and a conductive material did have a PTC effect, and the addition of the inorganic filler significantly improved the DCR growth of the battery at a high temperature, that is, the PTC effect was more remarkable.

4.2 Effect of the Content of Each Component Contained in the Safety Coating

In order to further study the effect of the content of each component contained in the safety coating, the corresponding safety coating, positive electrode plate, negative electrode plate and battery were prepared with the specific materials and amounts listed in Table 2-1 below according to the methods and procedures described in "1. Preparation method", and then were tested according to the method specified in "3. Test for battery performance". In order to ensure the accuracy of data, 4 samples were prepared for each battery (10 samples for the puncture test or overcharge test) and tested independently. The test results were finally averaged and shown in Table 2-2.

TABLE 2-2

Performance of lithium-ion batteries

| Battery | Positive electrode | Negative electrode | Puncture Test | Cycle Life (cycle) |
|---|---|---|---|---|
| Battery 6 | Comp. Plate 2-1 | CPlate N | 5 pass, 5 not pass | 2502 |
| Battery 7 | Plate 2-2 | CPlate N | 10 pass | 2351 |
| Battery 8 | Plate 2-3 | CPlate N | 10 pass | 2205 |
| Battery 9 | Plate 2-4 | CPlate N | 10 pass | 2251 |
| Battery 10 | Plate 2-5 | CPlate N | 10 pass | 2000 |
| Battery 11 | Plate 2-6 | CPlate N | 10 pass | 2408 |
| Battery 12 | Plate 2-7 | CPlate N | 10 pass | 2707 |
| Battery 13 | Plate 2-8 | CPlate N | 10 pass | 2355 |
| Battery 14 | Plate 2-9 | CPlate N | 10 pass | 1800 |
| Battery 15 | Comp. Plate 2-10 | CPlate N | 4 pass, 6 not pass | 1715 |

The data in Table 2-1 and Table 2-2 show that: (1) If the content of the inorganic filler is too low, the stability of the safety coating is not high enough, so safety performance of the battery cannot be fully improved; if the content of the inorganic filler is too high, the content of the polymer matrix is too low, so that the safety coating cannot exert its effect; (2) the conductive material has a great influence on the internal resistance and polarization of the battery, so it would affect the cycle life of the battery. The higher the content of the conductive material, the smaller the internal resistance and polarization of the battery is so that the cycle life will be better.

It had been found through experiments that the appropriate content range of each component in the safety coating is as follows:

the weight percentage of the polymer matrix is 35 wt % to 75 wt %; and/or the weight percentage of the conductive material is 5 wt % to 25 wt %; and/or the weight percentage of the inorganic filler is from 10 wt % to 60 wt %.

As long as the content of each component in the safety coating is within the above range, the effect of improving the safety and electrical performance (e.g., cycle performance) of the battery can be achieved.

4.3 Effect of the Kind of the Inorganic Filler on Battery Performance

In order to further study the effect of materials in the safety coating on performance of the electrode plate and the battery, the corresponding safety coating, positive electrode plate, negative electrode plate and battery were prepared with the specific materials and amounts listed in Table 3-1

TABLE 2-1

Compositions of electrode plate

| | Current collector | positive active material | Composition of the safety coating | | | | | | Thickness of safety coating H (μm) |
|---|---|---|---|---|---|---|---|---|---|
| | | | polymer matrix | | conductive material | | Inorganic filler | | |
| | | | material | wt % | material | wt % | material | wt % | |
| Comp. Plate2-1 | Al foil | NCM811 | Uncrosslinked PVDF | 75 | SP | 20 | alumina | 5 | 8 |
| Plate2-2 | Al foil | NCM811 | Uncrosslinked PVDF | 75 | SP | 15 | alumina | 10 | 8 |
| Plate2-3 | Al foil | NCM811 | Uncrosslinked PVDF | 75 | SP | 10 | alumina | 15 | 8 |
| Plate2-4 | Al foil | NCM811 | Uncrosslinked PVDF | 60 | SP | 10 | alumina | 30 | 8 |
| Plate2-5 | Al foil | NCM811 | Uncrosslinked PVDF | 60 | SP | 8 | alumina | 32 | 8 |
| Plate2-6 | Al foil | NCM811 | Uncrosslinked PVDF | 55 | SP | 15 | alumina | 30 | 8 |
| Plate2-7 | Al foil | NCM811 | Uncrosslinked PVDF | 50 | SP | 25 | alumina | 25 | 8 |
| Plate2-8 | Al foil | NCM811 | Uncrosslinked PVDF | 40 | SP | 15 | alumina | 45 | 8 |
| Plate2-9 | Al foil | NCM811 | Uncrosslinked PVDF | 35 | SP | 5 | alumina | 60 | 8 |
| Comp. Plate2-10 | Al foil | NCM811 | Uncrosslinked PVDF | 25 | SP | 5 | alumina | 70 | 8 | below according to the methods and procedures described in "1. Preparation method", and were tested according to the method specified in "3. Test for battery performance". In order to ensure accuracy of data, 4 samples were prepared for each battery (10 samples for the puncture test or overcharge test) and tested independently. The test results were finally averaged which were shown in Table 3-2.

TABLE 3-1

Compositions of electrode plate

| | | Positive active material | Composition of the safety coating | | | | | | Thickness of safety coating H (μm) |
|---|---|---|---|---|---|---|---|---|---|
| | Current collector | | polymer matrix | | conductive material | | Inorganic filler | | |
| | | | material | wt % | material | wt % | material | wt % | Carbon Content |
| Plate2-41 | Al foil | NCM811 | Uncrosslinked PVDF | 60 | SP | 10 | alumina | 30 | / | 8 |
| Plate2-42 | Al foil | NCM811 | Uncrosslinked PVDF | 60 | SP | 10 | LFP | 30 | / | 8 |
| Plate2-43 | Al foil | NCM811 | Uncrosslinked PVDF | 60 | SP | 10 | LFP/C | 30 | 1 | 8 |
| Plate2-44 | Al foil | NCM811 | Uncrosslinked PVDF | 60 | SP | 10 | LFP/C | 30 | 2 | 8 |
| Plate2-45 | Al foil | NCM811 | Uncrosslinked PVDF | 60 | SP | 10 | LFP/C | 30 | 3 | 8 |
| Plate2-46 | Al foil | NCM811 | Uncrosslinked PVDF | 60 | SP | 10 | $Li_4Ti_5O_{12}$/C | 30 | 5 | 8 |

TABLE 3-2

Performance of lithium-ion batteries

| Battery | Positive electrode | Negative electrode | Puncture Test | Overcharge Test | Cycle test (cycle) |
|---|---|---|---|---|---|
| Battery 46 | Plate2-41 | CPlate N | 10 pass | 0 pass, 10 not pass | 2200 |
| Battery 47 | Plate2-42 | CPlate N | 10 pass | 10 pass | 2300 |
| Battery 48 | Plate2-43 | CPlate N | 10 pass | 10 pass | 2500 |
| Battery 49 | Plate2-44 | CPlate N | 10 pass | 10 pass | 2700 |
| Battery 50 | Plate2-45 | CPlate N | 10 pass | 10 pass | 2900 |
| Battery 51 | Plate2-46 | CPlate N | 10 pass | 10 pass | 3000 |

The data in Tables 3-1 and 3-2 showed that compared to other materials (such as alumina), the electrochemically active material significantly improved the overcharge safety performance of the battery. In addition, carbon coating modified electrochemically active material further improved the cycle life of the battery.

4.4 Effect of Crosslinking on Performance of Plate and Battery

The corresponding safety coating, positive electrode plate, negative electrode plate and battery were prepared with the specific materials and amounts listed in Table 4-1 below according to the methods and procedures described above, and were tested according to the specified method to study the effect of the crosslinking on coating cracking and DCR.

TABLE 4-1

Effect of crosslinking agent

| | Current collector | positive active material | Composition of the safety coating | | | | | | | | Thickness of the underlying layer H material (μm) | Cracking (coating speed 50 m/min) |
|---|---|---|---|---|---|---|---|---|---|---|---|---|
| | | | polymer matrix | | Conductive material | | Inorganic filler | | Crosslinking agent | | | |
| | | | material | wt % | material | wt % | material | wt % | type | Ratio to the polymer | | |
| Plate 2-51 | Al foil | NCM811 | Uncrosslinked PVDF | 60 | SP | 10 | LFP/C | 30 | No | 0 | 8 | Severe cracking |
| Plate 2-52 | Al foil | NCM811 | Crosslinked PVDF | 60 | SP | 10 | LFP/C | 30 | Acrylonitrile | 0.01% | 8 | Mild cracking |
| Plate 2-53 | Al foil | NCM8U | Crosslinked PVDF | 60 | SP | 10 | LFP/C | 30 | Tetraisocyanate | 0.1% | 8 | No cracking |
| Plate 2-54 | Al foil | NCM811 | Crosslinked PVDF | 60 | SP | 10 | LFP/C | 30 | Polyethylene glycol | 0.5% | 8 | No cracking |
| Plate 2-55 | Al foil | NCM811 | Crosslinked PVDF | 60 | SP | 10 | LFP/C | 30 | Acrylonitrile | 1.5% | 8 | No cracking |
| Plate 2-56 | Al foil | NCM811 | Crosslinked PVDF | 60 | SP | 10 | LFP/C | 30 | Acrylonitrile | 5% | 8 | No cracking |
| Plate 2-57 | Al foil | NCM811 | Uncrosslinked PVDC | 60 | SP | 10 | LFP/C | 30 | No | No | 8 | Severe cracking |
| Plate 2-58 | Al foil | NCM811 | Crosslinked PVDC | 60 | SP | 10 | LFP/C | 30 | Acrylonitrile | 3% | 8 | No cracking |

In the case where the coating speed of the positive active material layer was 50 m/min, the polymer matrix of the electrode plate 2-51 was not crosslinked by adding a crosslinking agent, and thus there was a severe cracking on the electrode plate. The addition of a crosslinking agent had a significant effect on improving the cracking of the electrode plate. No cracking occurred in the electrode plate 2-53 to the electrode plate 2-56. Similar experiments were performed for PVDC (electrode plates 2-57 and 2-58) and the results were similar. It can be seen that the addition of the crosslinking agent significantly eliminated the coating cracking of the electrode plate.

TABLE 4-2

Performance of lithium-ion battery

| Battery | Positive electrode | Negative electrode | DCR of the battery | Puncture Test |
|---|---|---|---|---|
| Battery 52 | Plate 2-51 | CPlate N | 100% | 10 pass |
| Battery 53 | Plate 2-52 | CPlate N | 80% | 10 pass |

TABLE 4-2-continued

Performance of lithium-ion battery

| Battery | Positive electrode | Negative electrode | DCR of the battery | Puncture Test |
|---|---|---|---|---|
| Battery 54 | Plate 2-53 | CPlate N | 85% | 10 pass |
| Battery 55 | Plate 2-54 | CPlate N | 78% | 10 pass |
| Battery 56 | Plate 2-55 | CPlate N | 75% | 10 pass |
| Battery 57 | Plate 2-56 | CPlate N | 84% | 10 pass |

For the electrode plate 2-51, the polymer matrix was not crosslinked by adding a crosslinking agent, and thus the polymer matrix was swelled greatly in the electrolyte, resulting in a large DCR. The addition of the crosslinking agent reduced the swelling of the polymer matrix in the electrolyte, and had a significant effect on reducing DCR. From above results, it was confirmed that the addition of the crosslinking agent significantly reduced the DCR of the battery.

In addition, the above data indicated that PVDF/PVDC can be used as the polymer matrix of PTC layer regardless of crosslinking, and the obtained battery had high safety performance in which the test result of puncture test is excellent, which indicated that the crosslinking treatment did not adversely affect the protective effect of the safety coating. Furthermore, compared with the uncrosslinked PVDC/PVDF, the crosslinking treatment improved the cracking of the electrode plate, from severe cracking to no cracking or mild cracking. The crosslinking treatment can reduce the swelling of the polymer matrix in the electrolyte, thereby reducing the DCR by 15% to 25%, thereby improving the electrical properties of the battery.

4.5 Effect of Ratio of the Polymer Matrix and the Conductive Material on Battery Performance In order to further study the effect of ratio of the polymer matrix and the conductive material on plate and battery performance, the corresponding positive electrode plates, negative electrode plates and batteries were prepared with the specific materials and amounts listed in Table 5-1 below according to the methods and procedures described in "1. Preparation method", and were tested according to the specified method "3. Tests for battery performance".

In order to ensure accuracy of data, 4 samples were prepared for each battery (10 samples for the puncture test) and tested independently. The test results were finally averaged which were shown in Table 5-2.

TABLE 5-1

Compositions of electrode plate

| | | | Composition of the safety coating | | | | | | Thickness of |
|---|---|---|---|---|---|---|---|---|---|
| | Current collector | Positive active material | polymer matrix material | wt % | conductive material | wt % | ratio* | Inorganic filler material | Carbon Content (wt %) | safety coating, H (μm) |
| Plate 2-61 | Al foil | NCM811 | Uncrosslinked PVDF | 35 | SP | 35 | 1 | LFP/C | 30 | 3 | 8 |
| Plate 2-62 | Al foil | NCM811 | Uncrosslinked PVDF | 40 | SP | 30 | 1.3 | LFP/C | 30 | 3 | 8 |
| Plate 2-63 | Al foil | NCM811 | Uncrosslinked PVDF | 47 | SP | 23 | 2 | LFP/C | 30 | 3 | 8 |
| Plate 2-64 | Al foil | NCM811 | Uncrosslinked PVDF | 52.5 | SP | 17.5 | 3 | LFP/C | 30 | 3 | 8 |
| Plate 2-65 | Al foil | NCM811 | Uncrosslinked PVDF | 56 | SP | 14 | 4 | LFP/C | 30 | 3 | 8 |
| Plate 2-66 | Al foil | NCM811 | Uncrosslinked PVDF | 63 | SP | 7 | 9 | LFP/C | 30 | 3 | 8 |

*ratio of the polymer matrix and the conductive material

TABLE 5-2

Performance of lithium-ion battery

| Battery | Positive electrode | Negative electrode | Puncture Test | Cycle Test (cycle) |
|---|---|---|---|---|
| Battery 61 | Plate 2-61 | CPlate N | 0 pass, 10 not pass | 2200 |
| Battery 62 | Plate 2-62 | CPlate N | 2 Pass, 8 not pass | 2300 |
| Battery 63 | Plate 2-63 | CPlate N | 10 pass | 2900 |
| Battery 64 | Plate 2-64 | CPlate N | 10 pass | 2700 |
| Battery 65 | Plate 2-65 | CPlate N | 10 pass | 2500 |
| Battery 66 | Plate 2-66 | CPlate N | 10 pass | 900 |

The data in Tables 5-1 and 5-2 showed that the ratio of the conductive material to the polymer matrix is important for the proper function of the safety coating. When the weight ratio of the polymer matrix to the conductive material was 2 or more, the safety coating functioned properly in which the PTC effect was significant, and all samples passed the Puncture Test. When the weight ratio of the polymer matrix to the conductive material was 2 or less, the relative content of the polymer matrix was low so that aluminum burr was not completely covered, and not all samples passed the Puncture Test.

When the weight ratio of the polymer matrix to the conductive material was greater than 8, although all samples passed the Puncture Test, the batteries showed significantly deteriorated cycle performance due to poor conductivity of the safety coating and its cycle performance just was 900 cycles at room temperature. Preferably, the weight ratio of the polymer matrix to the conductive material was 3 or more and 8 or less.

It will be understood by those skilled in the art that the above application examples of the electrode plate of the present application are only exemplified to be used for a lithium battery, but the electrode plate of the present application can also be applied to other types of batteries or electrochemical devices, and still may produce good technical effect of the present application.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

The invention claimed is:

1. A positive electrode plate comprising a current collector, a positive active material layer and a safety coating disposed between the current collector and the positive active material layer, the safety coating comprising a polymer matrix, a conductive material and an inorganic filler, wherein the polymer matrix is selected from at least one of fluorinated polyolefin or chlorinated polyolefin having a crosslinked structure and a weight ratio of the polymer matrix to the conductive material is 2 or more,
   wherein an operating temperature range of the safety coating is from 80° C. to 160° C.,
   wherein a weight ratio of a crosslinking agent to the polymer matrix is from 0.01% to 5%,
   wherein the inorganic filler is an inorganic salt modified with a conductive carbon coating, and wherein the inorganic salt is at least one of lithium iron phosphate, lithium titanate, lithium cobalt oxide, lithium nickel manganese cobalt oxide, lithium nickel manganese aluminium oxide, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese, or spinel lithium nickel manganese oxide.

2. The positive electrode plate as claimed in claim 1, wherein the polymer matrix of the safety coating is selected from at least one of polyvinylidene fluoride (PVDF), carboxylic acid modified PVDF, acrylic acid modified PVDF, polyvinylidene chloride (PVDC), carboxylic acid modified PVDC, acrylic acid modified PVDC, PVDF copolymers, or PVDC copolymers.

3. The positive electrode plate as claimed in claim 1, wherein the conductive material is selected from at least one of a conductive carbon-based material, a conductive metal material, or a conductive polymer material.

4. The positive electrode plate as claimed in claim 3, wherein the conductive material is selected from the conductive carbon-based material, and wherein the conductive carbon-based material is selected from at least one of conductive carbon black, acetylene black, graphite, graphene, carbon nanotubes, or carbon nanofibers.

5. The positive electrode plate as claimed in claim 3, wherein the conductive material is selected from the conductive metal material, and wherein the conductive metal material is selected from at least one of Al powder, Ni powder, or gold powder.

6. The positive electrode plate as claimed in claim 3, wherein the conductive material is selected from the conductive polymer material, and wherein the conductive polymer material is selected from at least one of conductive polythiophene, conductive polypyrrole, or conductive polyaniline.

7. The positive electrode plate as claimed in claim 1, wherein in the safety coating, relative to a total weight of the inorganic filler, the polymer matrix and the conductive material,
   a weight percentage of the inorganic filler is 10 wt % to 60 wt %.

8. The positive electrode plate as claimed in claim 1, wherein the weight ratio of the polymer matrix to the conductive material is 3 or more and 8 or less.

9. The positive electrode plate as claimed in claim 1, wherein the current collector has a thickness of 4 to 16 micrometers.

10. The positive electrode plate as claimed in claim 1, wherein the safety coating has a thickness H of $1\ \mu m \leq H \leq 20\ \mu m$.

11. An electrochemical device comprising the positive electrode plate as claimed in claim 1, which is a capacitor, a primary battery or a secondary battery.

12. A battery module comprising a battery comprising the positive electrode plate as claimed in claim 1.

13. A battery pack comprising a battery module, wherein the battery module comprises a battery comprising the positive electrode plate as claimed in claim 1.

14. A device comprising a battery comprising the positive electrode plate as claimed in claim 1, and the device comprises an electric vehicle, a hybrid electric vehicle, a plug-in hybrid electric vehicle, an electric bicycle, an electric scooter, an electric golf cart, an electric truck, an electric ship, or an energy storage system.

15. The positive electrode plate as claimed in claim 1, wherein the inorganic filler has an average particle diameter D of $100\ nm \leq D \leq 10\ \mu m$.

16. The positive electrode plate as claimed in claim 1, wherein the inorganic filler has a specific surface area (BET) of not more than 500 m$^2$/g.

17. The positive electrode plate as claimed in claim 1, wherein the safety coating has a thickness H of $3\ \mu m \leq H \leq 10\ \mu m$.

18. The positive electrode plate as claimed in claim 1, wherein the current collector has an elongation at break δ of $0.8\% \leq \delta \leq 4\%$.

19. The positive electrode plate as claimed in claim 1, wherein in the safety coating, relative to a total weight of the inorganic filler, the polymer matrix and the conductive material, a weight percentage of the polymer matrix is 35 wt % to 75 wt %.

20. The positive electrode plate as claimed in claim 1, wherein in the safety coating, relative to a total weight of the inorganic filler, the polymer matrix and the conductive material, a weight percentage of the conductive material is 5 wt % to 25 wt %.

* * * * *